US006980746B2

(12) United States Patent
Hayee (10) Patent No.: US 6,980,746 B2
(45) Date of Patent: Dec. 27, 2005

(54) ELECTRONIC RZ/CSRZ SIGNAL GENERATION FOR OPTICAL COMMUNICATION SYSTEMS

(75) Inventor: M. Imran Hayee, Columbia, MD (US)

(73) Assignee: Dorsal Networks, Inc., Columbia, MD (US)

( * ) Notice: Subject to any disclaimer, the term of this patent is extended or adjusted under 35 U.S.C. 154(b) by 684 days.

(21) Appl. No.: 09/953,567

(22) Filed: Sep. 17, 2001

(65) Prior Publication Data

US 2003/0053179 A1 Mar. 20, 2003

(51) Int. Cl.[7] .............................................. H04B 10/04
(52) U.S. Cl. ...................... 398/183; 398/182; 398/186; 398/188; 398/189; 398/194; 398/195; 398/198; 398/154; 398/155; 398/79; 398/91; 398/95; 398/45
(58) Field of Search ................................. 398/182, 183, 398/186, 188, 189, 194, 195, 198, 154, 155, 398/79, 91, 95, 45

(56) References Cited

U.S. PATENT DOCUMENTS

| 5,521,738 | A | * | 5/1996 | Froberg et al. ............. 398/183 |
| 5,828,477 | A | | 10/1998 | Nilsson et al. |
| 5,991,471 | A | | 11/1999 | Yu |
| 6,014,479 | A | | 1/2000 | Darcie |
| 6,072,615 | A | | 6/2000 | Mamyshev |
| 6,718,142 | B1 | * | 4/2004 | Murai ......................... 398/183 |

FOREIGN PATENT DOCUMENTS

| EP | 0 957 596 A3 | 11/1999 |
| EP | 0 964 538 A2 | 12/1999 |
| EP | 1 041 754 A1 | 4/2000 |

OTHER PUBLICATIONS

Article—"320 Gbit/s (8+40 Gbit/s) WDM transmission over 367-km zero-dispersion-flattened line with 120-km repeater spacing using carrier-suppressed return-to-zero pulse format"—Yutaka Miyamoto, et al., PdP4-1 through PdP4-4.
Article—"100 Gb/s Error Free Transmission over 9100 km using Twenty 5 Gb/s WDM Channels"—Neal S. Bergano, et al., Pd23-1/419 through Pd23-4/422.
Magazine—"A Journal of the AT&T Companies", AT&T Technical Journal, Jan./Feb. 1995, vol. 74, No. 1.
Article—"40-GHz Pulse Train Generation Using Soliton Compression of a Mach-Zehnder Modulator Output," IEEE Photonics Technology Letter, vol. 7, No. 1, Jan. 1995, Eric A. Swanson et al., pp. 114-116.

* cited by examiner

Primary Examiner—Hanh Phan (57) ABSTRACT

A method and system for generating both return-to-zero (RZ) and carrier suppressed return-to-zero (CSRZ) shaped signals using only a single optical modulator. The system includes: a switch for receiving a data signal and a clock signal as inputs, and outputting a voltage signal; a unit for controllably adjusting the phase of said clock signal before input to the switch; an optical modulator for receiving a continuous wave light (CW) signal and the voltage signal as inputs, and outputting one of an RZ and a CSRZ signal. To generate a CSRZ signal, the optical modulator is biased at a transmission minimum level signal. To generate an RZ signal, the optical modulator is biased at a transmission maximum level and the clock signal is phase shifted. Also disclosed is an optical communication transceiver including a plurality of optical modulator circuits generating both RZ and CSRZ signals. The transceiver also includes a wavelength division multiplexer for combining the generated signals from the plurality of optical modulator circuits for transmission.

38 Claims, 6 Drawing Sheets

ELECTRONIC RZ/CSRZ SIGNAL GENERATION FOR OPTICAL COMMUNICATION SYSTEMS

BACKGROUND OF THE INVENTION

A. Field of the Invention

The field of the present invention is optical communications. Specifically, the present invention is directed to a device and method for generating both RZ and CSRZ signals using only one optical modulator.

B. Description of the Related Art

Various ways are known to optically generate RZ (return to zero) and CSRZ (carrier suppressed return to zero) shaped signals for optical communications. As is known by those skilled in the art, both RZ and CSRZ signals have their benefits in optical communications. Depending upon the application, it may be preferable to use one type of signal shape over another. For example, CSRZ shaped signals may be preferable for use in DWDM (dense wave division multiplexing) applications. CSRZ signals have lesser bandwidth so, in narrow channel spacing configurations like DWDM, the use of CSRZ can be better than regular RZ in reducing linear and even non-linear crosstalk.

There are known solutions for generating both RZ and CSRZ shaped signals in the optical domain using multiple optical modulators as will be discussed in more detail herein. However, such modulators can be very expensive, and it is known that electrical modulation can be accomplished in a more inexpensive manner. There is at least one method known for shaping RZ signals using electronic modulation and only one optical modulator. This solution is also discussed in further detail herein. The main problem with this solution is that it is limited only to RZ signals and does not allow for the shaping of CSRZ signals. As discussed above, for certain applications it may be beneficial to have the ability to generate CSRZ shaped signals.

SUMMARY OF THE INVENTION

The present invention provides a solution to the foregoing problem. Specifically, the invention provides an inexpensive way to generate both RZ and CSRZ shaped signals using only a single optical modulator.

As claimed, the present invention is directed to an optical communications system and method for generating both return-to-zero (RZ) and carrier suppressed return-to-zero (CSRZ) signals, where the system includes: a switch for receiving a data signal and a clock signal as inputs, and outputting a voltage signal; a unit for controllably adjusting the phase of said clock signal before input to the switch; an optical modulator for receiving a continuous wave light (CW) signal and the voltage signal as inputs, and outputting one of an RZ and a CSRZ signal. To generate a CSRZ signal, the optical modulator is biased at a transmission minimum level signal. To generate an RZ signal, the optical modulator is biased at a transmission maximum level and the clock signal is phase shifted.

The present invention is also directed to an optical communication transceiver including a plurality of optical modulator circuits generating both RZ and CSRZ signals. Each modulator circuit includes: a switch for receiving a data signal and a clock signal as inputs, and outputting a voltage signal; a unit for controllably adjusting the phase of at least one of the data signal and the clock signal before input to the switch; an optical modulator for receiving a continuous wave light (CW) signal and the voltage signal as inputs, and outputting one of an RZ and a CSRZ signal. To generate a CSRZ signal, the optical modulator is biased at a transmission minimum level. To generate an RZ signal, the optical modulator is biased at a transmission maximum level and the clock signal and the data signal are made to be out of phase. The transceiver also includes a wavelength division multiplexer for combining the generated signals from the plurality of optical modulator circuits for transmission.

Other embodiments, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

The present invention is now described in detail with reference to the above-mentioned figures. The present invention can be summarized as a method and system for use in optical communications for generating both RZ and CSRZ signals.

Figure 1:
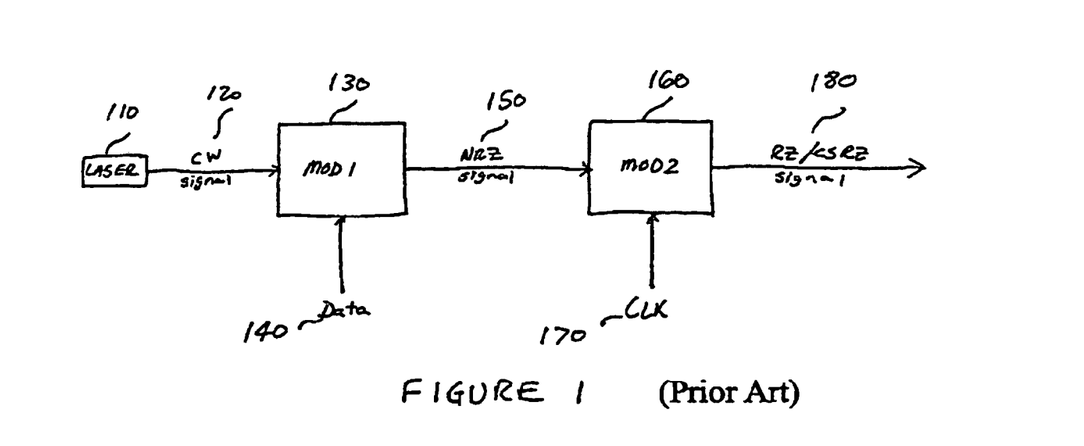
FIG. 1 illustrates a signal shaping system of the prior art in which two optical modulators are used.

FIG. 1 illustrates a system configuration used in optical communications for shaping RZ and CSRZ signals. In this illustration, laser 110 provides a continuous wave light (CW) signal 120 to an optical modulator 30. The data signal 140 to be transmitted is input to the optical modulator 130 to generate the output signal 150 which is a non-return to zero (NRZ) signal. This NRZ signal is an optical signal representing the data stream and contains a stream of square shaped light pulses where a "light on" condition represents a data 1 and a "light off" (or effectively off) condition represents a data 0. This NRZ signal 150 is then shaped by a second modulator 160. The modulating signal input to the optical modulator 160 is the clock signal 170. In this way the NRZ signal 150 is shaped into the sinusoidal pulses of an RZ or a CSRZ signal 180.

Figure 2:
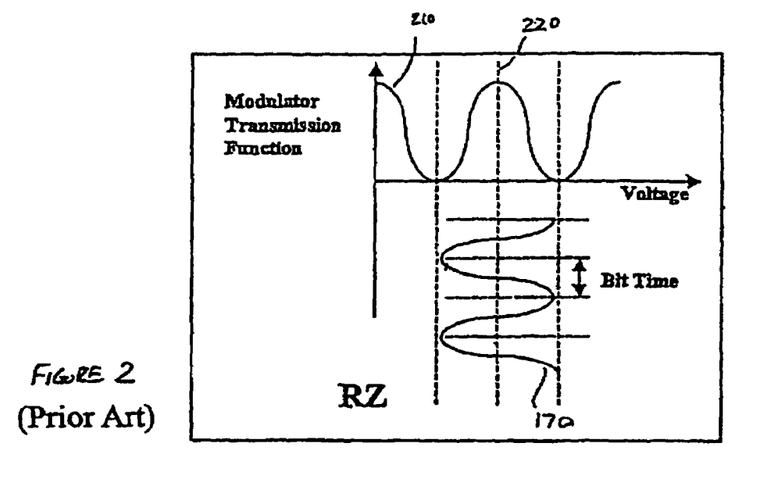
FIGS. 2 and 3 show modular transmission functions and clock signals used to generate RZ shaped signals.

FIG. 2 illustrates the modulator transmission function of the second optical modulator 160, as well as the clock signal 170 which is input to that modulator. The modulator transmission function is shown as graph 210. The clock or voltage signal input to the optical modulator is shown as graph 170. The center level of this voltage signal 170, that is, the bias of the modulator is shown as dotted line 220. In this configuration, it can be seen that the optical modulator is biased at a transmission maximum level; see, for example, line 220 intersecting graph 210 at the maximum level of transmission of the optical modulator. Furthermore, the clock signal 170 is set to have a frequency of one-half the frequency of the data signal. With these settings, that is, the modulator biased at the transmission maximum and the clock signal having a frequency of half that of the data signal, an RZ shaped output signal can be generated. For the purposes of this application and as is used in the art, RZ signal is meant to refer to regular RZ or non-carrier suppressed RZ as it is sometimes called.

Figure 3:
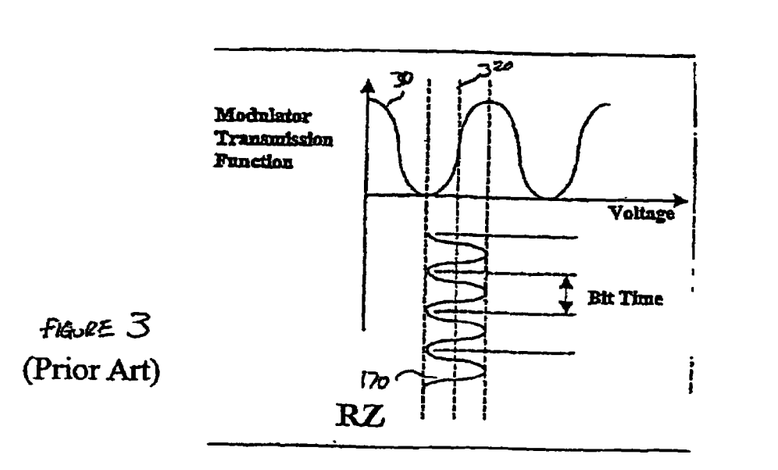

FIG. 3 illustrates the modulator transmission function of optical modulator 160 along with the clock signal 170. This configuration illustrates another method for generating RZ shaped signals. Here the modulator function is shown as 310 and the center level of the clock signal is shown as dotted line 320. In this configuration, the modulator is biased at the midpoint between transmission maximum and transmission minimum level, as is shown by the intersection of dotted line 320 with the graph 310. Furthermore, in this configuration, the frequency of the clock signal is the same as that of the data signal. With this combination an RZ shaped signal can be generated.

Figure 4:
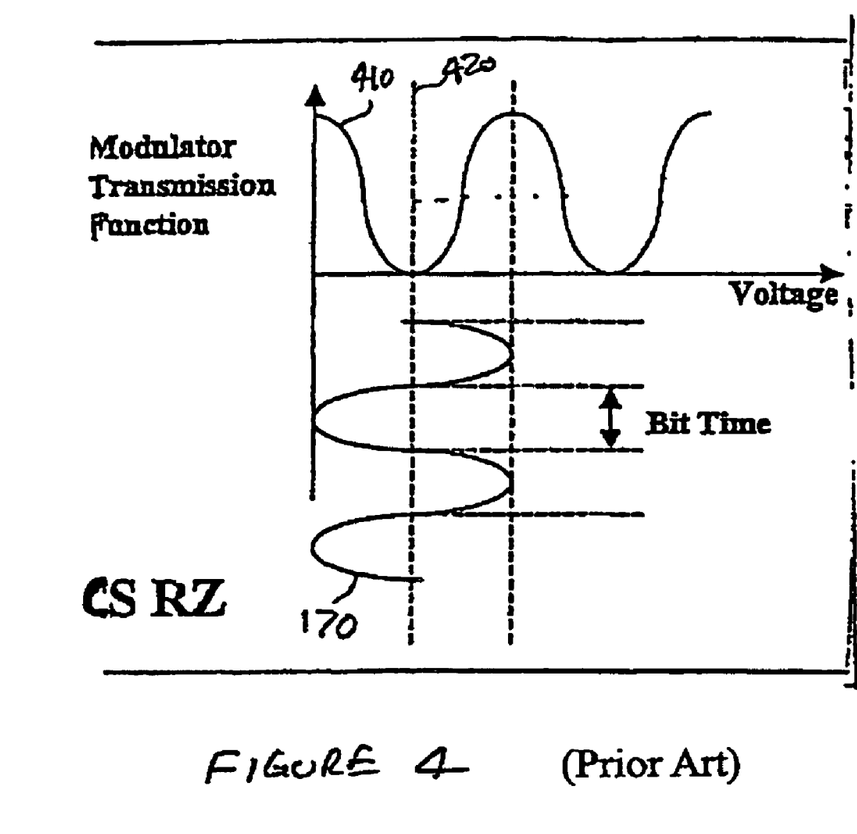
FIG. 4 shows the modulator transmission function and clock signal used to generate a CSRZ shaped signal.

There is also known at least one method for generating CSRZ shaped signals using optical modulators. FIG. 4 illustrates such a configuration and shows the modular transmission function 410 of the optical modulator 160 along with the clock signal 170. The center level of this clock signal is shown with dotted line 420. In this configuration the optical modulator is biased at a transmission minimum level as shown by the intersection of line 420 with graph 410. Furthermore, the clock signal 170 has a frequency one half that of the data signal. With this configuration a carrier suppressed RZ shaped signal can be generated.

Figure 5:
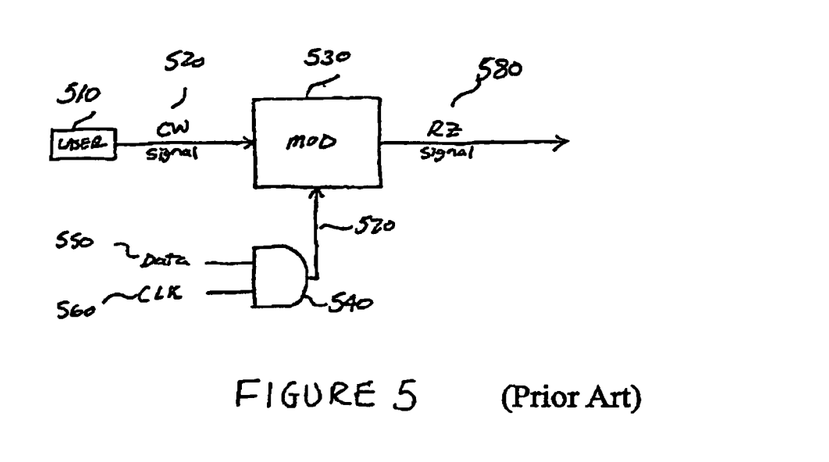
FIG. 5 illustrates a system according to the present invention for generating an RZ shaped signal using only a single optical modulator.

FIGS. 1–4 are directed to optical generation of RZ or CSRZ signals in the prior art. As mentioned above, optical modulators are very expensive and it would be preferable to have a system that would provide signal shaping at a lower cost. One such system is shown in FIG. 5. In this system laser 510 provides a CW signal 520 to an optical modulator 530. The modulating signal 570 provided to the optical modulator 530 is the output of a logic AND gate 540. The data signal 550 and the clock signal 560 are the inputs to the AND gate 540. With this combination of the data and clock signals being input to the modulator 530, an RZ shaped signal 580 is generated at the output. This system has the benefit of needing only one optical modulator and provides for RZ shaping "electronically" so to speak, through the use of a logic AND gate 540. However, this system suffers from the drawback that the user has no control to generate a CSRZ shaped signal. That is, only a regular RZ signal can be generated.

Figure 6A:
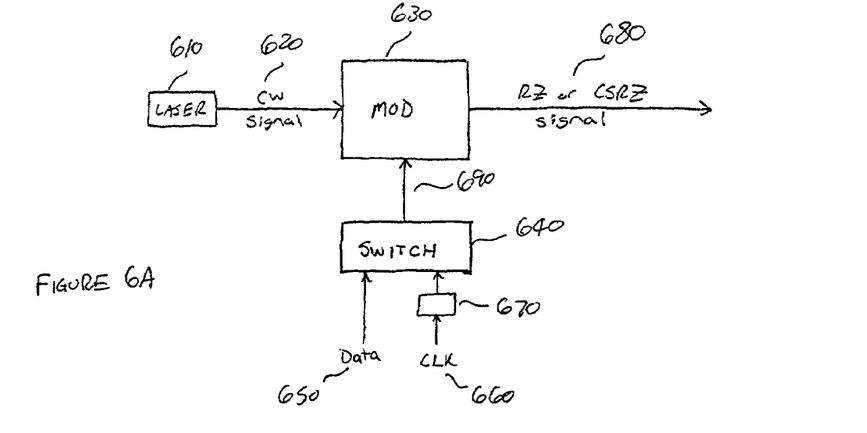
FIGS. 6A–6C illustrate configurations of a system according to the present invention for generating either an RZ or a CSRZ shaped signal using only a single optical modulator.
Figure 6B:
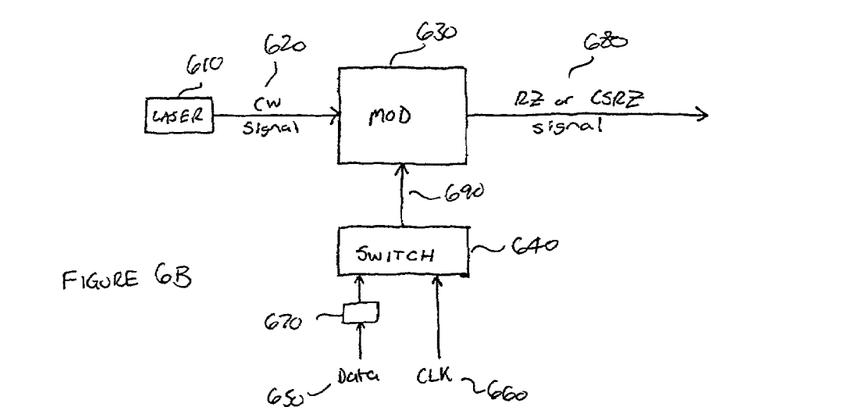
Figure 6C:
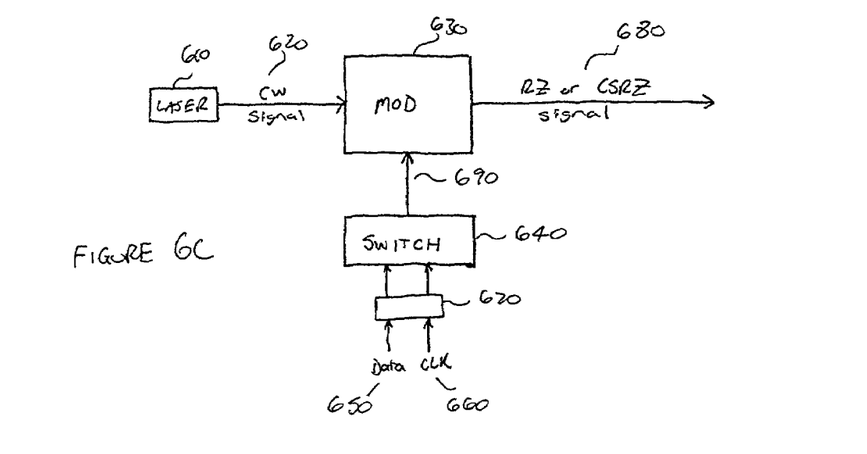

As mentioned above, it is sometimes important to be able to generate not only a RZ signal but also a CSRZ signal. Accordingly, the device of the present invention, as shown in FIGS. 6A–6C, address this problem. In simplest terms, the AND gate 540 has been replaced by a switch 640. In the system shown in FIGS. 6A–6C, laser 610 provides a CW signal 620 to an optical modulator 630. This modulator is modulated by a signal 690 which is the output of switch 640.

One input to switch 640 is the data signal 650. This data signal controls the operation of the switch. That is, the switch is opened or closed based on the data signal. When the data signal is a logic level 1 the switch is open, and when the signal is a logic level 0 the switch is closed.

The signal being allowed to pass or prevented from passing to the optical modulator is that of the clock signal 660. In the preferred embodiment, switch 640 is an analog electronic switch that can output both positive and negative voltages. One limitation of this switch is its speed. Applicant envisions that, based on the availability of higher speed switches, the invention described herein could be used for higher speed data transmission.

In FIG. 6A, which illustrates a first embodiment of the present invention, there is a delay unit 670 placed between the source of the clock signal 660 and the switch 640. This delay unit allows for the phase shifting of the clock signal 660 and is preferably a standard electronic delay line that is adjustable. In FIG. 6B which illustrates a second embodiment of the present invention, the same configuration as that of FIG. 6A is found except for the location of delay unit 670. In this embodiment, delay unit 670 is placed between the source of data signal 650 and the switch 640. The role of the delay unit 670 in this scenario is to phase shift the data signal 650. Similarly, in FIG. 6C which illustrates a third embodiment of the present invention, the delay unit 670 is positioned such that it receives both the data signal 650 and the clock signal 660, which are then output to the switch 640. Its role in this scenario is to adjust the relative phase between the data signal and the clock signal by adjusting one or both of these signals.

Figure 7:
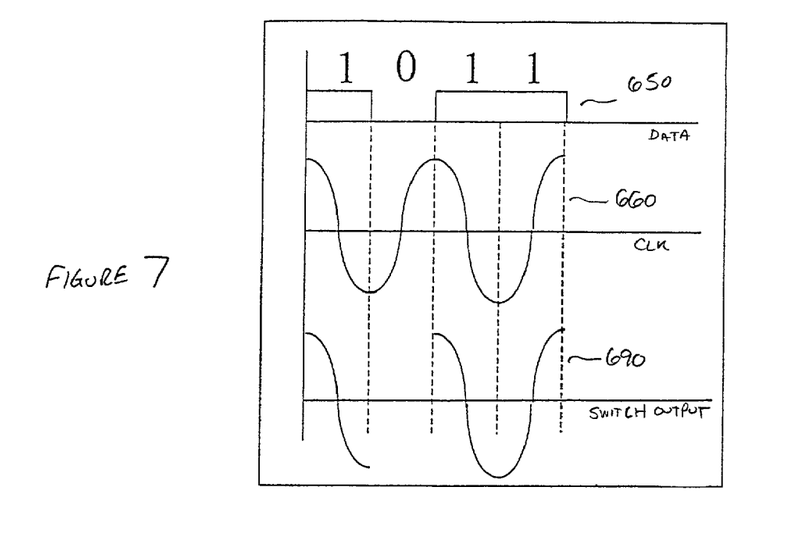
FIG. 7 is a timing diagram illustrating various signals used in the system of the present invention for generating an RZ shaped signal.
Figure 8:
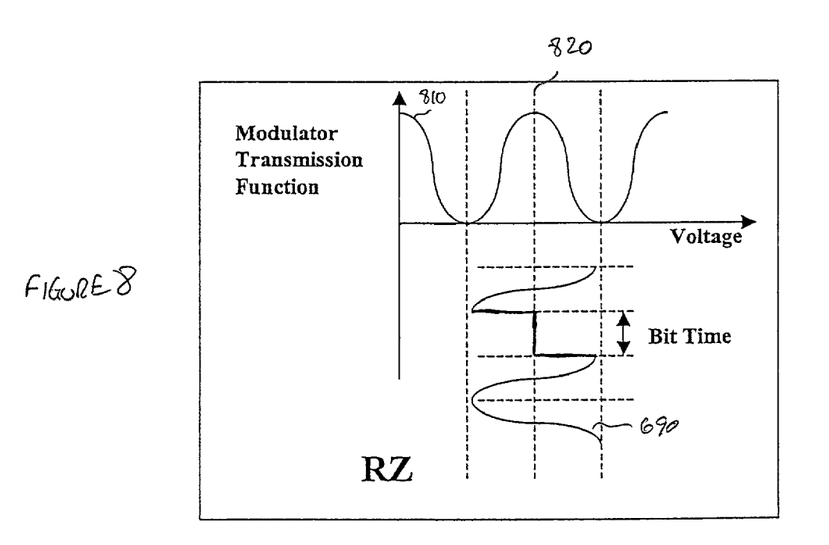
FIG. 8 illustrates the modulator transmission function and the modulating signal used to generate an RZ shaped signal in the present invention.

FIGS. 7 and 8 illustrate the timing diagrams, transmission functions and clock signals used to generate an RZ shaped signal using the method and device of the present invention. In FIG. 7, a small segment of the data signal 650 is shown. Four bits of the signal are shown as 1-0-1-1. The sinusoidal voltage signal under the data signal 650 is the clock signal 660. The frequency of this clock signal is one half that of the data signal. Initially, these two signals are in-phase. However, as shown, clock signal 660 is out of phase with respect to the data signal by one-half bit or alternatively, one-quarter cycle of the clock signal. This phase shift is accomplished using a delay unit 670 and can be performed on solely the clock signal as shown in FIG. 6A, solely the data signal as shown in FIG. 6B, or potentially on both signals such that the relative phase difference is one half bit, as can be accomplished through the configuration shown in FIG. 6C.

Thus, the data signal and the clock signal are input to the switch 640 with the operation of the switch being controlled by the data signal. Thus, when the data signal is a logic high or 1, the switch is open and the clock signal is allowed to pass through to the switch output 690. When the data signal is a logic low or 0, the switch is closed and the clock signal is prevented from passing through. The switch output 690 then is at a zero voltage level. This switch output signal is then input to the optical modulator 630 as the modulating signal for shaping the CW signal 620.

FIG. 8 illustrates the modulator transmission function 810 along with the modulating signal that is the switch output signal 690. The center level of this voltage signal is shown as dotted line 820. As can be seen from this figure, to generate an RZ shaped signal, the optical modulator 630 is biased at a transmission maximum level. This is indicated by the line 820 intersecting the graph 810 at a transmission maximum level. Using this configuration, RZ signal shaping can be accomplished. Note that delay unit 670 is controlled by the user and is set to create a delay or phase shift when RZ signal shaping is desired. In addition, the optical modulator 630 is biased at a transmission maximum level.

Figure 9:
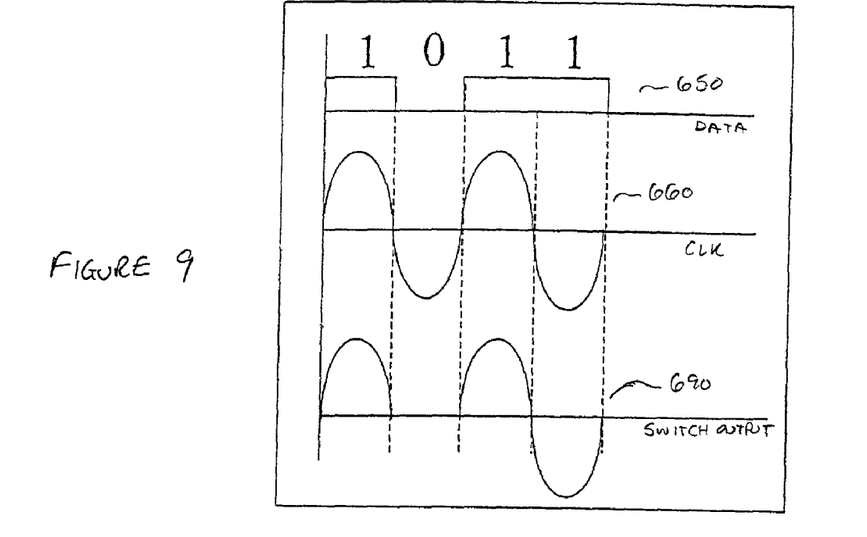
FIG. 9 is a timing diagram illustrating the various signals used to generate a CSRZ shaped signal in the present invention.
Figure 10:
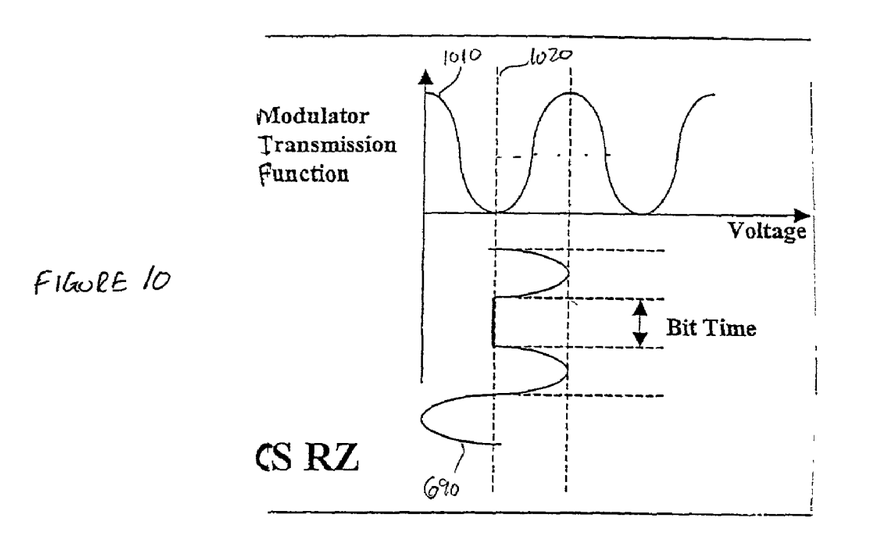
FIG. 10 illustrates the modulator transmission function and the modulating signal used to generate a CSRZ signal in the present invention.

FIGS. 9 and 10 illustrate how a CSRZ shaped signal can be generated using the same device as shown in FIGS. 6A–6C of the present invention. The same data signal 650 is shown, as well as the same clock signal 660, however, in this scenario there is no phase shift between the clock signal and the data signal. The frequency of the clock signal is one half that of the data signal. The data signal controls the switch 640 as discussed above, resulting in the passing of the clock signal 660 to the switch output 690 during the period when the data signal is a logic level high or 1 and prevents the passing of the clock signal when the data signal is at a logic level low or 0. This is shown by the switch output diagram 690 in FIG. 9.

FIG. 10 illustrates the modular transmission function 1010 of the optical modulator 630 as well as the switch output signal 690. The center level of this switch output voltage signal is shown with dashed line 1020. In this scenario, the optical modulator 630 is biased at a transmission minimum level. This is shown by the intersection of line 1020 with graph 1010 at a transmission minimum level. With this configuration, CSRZ shaping can be accomplished. Specifically, the data signal and clock signal are in phase since the delay unit 670 is either logically removed or set to have no phase shift impact on the signals. Also, the optical modulator 630 is set to bias at a transmission minimum level. With this combination, CSRZ shaping is accomplished.

Furthermore, it is now evident that both RZ and CSRZ shaping can be accomplished using the same device as shown in FIGS. 6A–6C by simply changing the bias level of the optical modulator 630 and controlling the phase difference between the data and clock signal.

It is envisioned that a plurality of such optical modulator circuits that are capable of generating both return to zero and carrier suppressed return to zero signals can be used together in order to generate a plurality of such signals for combination using wavelength division multiplexing and subsequent transmission.

It should be understood that the above description of the invention and specific examples and embodiments, while indicating the preferred embodiments of the present invention are given by demonstration and not limitation. Many changes and modifications within the scope of the present invention may be made without departing from the spirit thereof and the present invention includes all such changes and modifications.

What is claimed is:

1. An optical communications system for generating both return-to-zero (RZ) and carrier suppressed return-to-zero (CSRZ) signals, said system comprising:
    a switch for receiving a data signal and a clock signal as inputs, and outputting a voltage signal;
    a unit for controllably adjusting the phase of said clock signal with respect to said data signal before input to said switch;
    an optical modulator for receiving a continuous wave light (CW) signal and said voltage signal as inputs, and outputting one of an RZ and a CSRZ signal;
    wherein said optical modulator is biased at a transmission minimum level to generate a CSRZ signal and wherein said optical modulator is biased at a transmission maximum level and said clock signal is phase shifted to generate an RZ signal.

2. An optical communications system according to claim 1 wherein said unit is an electronic delay line.

3. An optical communications system according to claim 1 wherein the phase shift of said clock signal is one-quarter cycle.

4. An optical communications system according to claim 1 further comprising a clock signal generator for generating said clock signal wherein said clock signal has a frequency substantially equal to one-half the data rate of said data signal.

5. An optical communications system according to claim 1 wherein said switch is configured to output said clock signal when said data signal is at a logic high and to output a zero voltage signal when said data signal is at a logic low.

6. An optical communications system according to claim 1 wherein said switch is an analog electronic switch.

7. An optical communications system for generating both return-to-zero (RZ) and carrier suppressed return-to-zero (CSRZ) signals, said system comprising:
    a switch for receiving a data signal and a clock signal as inputs, and outputting a voltage signal;
    an unit for controllably adjusting the phase of said data signal with respect to said clock signal before input to said switch;
    an optical modulator for receiving a continuous wave light (CW) signal and said voltage signal as inputs, and outputting one of an RZ and a CSRZ signal;
    wherein said optical modulator is biased at a transmission minimum level to generate a CSRZ signal and wherein said optical modulator is biased at a transmission maximum level and said data signal is phase shifted to generate an RZ signal.

8. An optical communications system according to claim 7 wherein said unit is an electronic delay line.

9. An optical communications system according to claim 7 wherein the phase shift of said data signal is one-half bit.

10. An optical communications system according to claim 7 further comprising a clock signal generator for generating said clock signal wherein said clock signal has a frequency substantially equal to one-half the data rate of said data signal.

11. An optical communications system according to claim 7 wherein said switch is configured to output said clock signal when said data signal is at a logic high and to output a zero voltage signal when said data signal is at a logic low.

12. An optical communications system according to claim 7 wherein said switch is an analog electronic switch.

13. An optical communications system for generating both return-to-zero (RZ) and carrier suppressed return-to-zero (CSRZ) signals, said system comprising:
    a switch for receiving a data signal and a clock signal as inputs, and outputting a voltage signal;
    a unit for controllably adjusting the phase of at least one of said data signal and said clock signal with respect to each other before input to said switch;
    an optical modulator for receiving a continuous wave light (CW) signal and said voltage signal as inputs, and outputting one of an RZ and a CSRZ signal;

wherein said optical modulator is biased at a transmission minimum level to generate a CSRZ signal and wherein said optical modulator is biased at a transmission maximum level and said clock signal and said data signal are made to be out of phase to generate an RZ signal.

14. An optical communications system according to claim 13 wherein said unit is an electronic delay line.

15. An optical communications system according to claim 13 wherein said clock signal and said data signal are made to be out of phase by one-half bit.

16. An optical communications system according to claim 13 further comprising a clock signal generator for generating said clock signal wherein said clock signal has a frequency substantially equal to one-half the data rate of said data signal.

17. An optical communications system according to claim 13 wherein said switch is configured to output said clock signal when said data signal is at a logic high and to output a zero voltage signal when said data signal is at a logic low.

18. An optical communications system according to claim 13 wherein said switch is an analog electronic switch.

19. A method of generating both return-to-zero (RZ) and carrier suppressed return-to-zero (CSRZ) signals in optical communications system, said method comprising:
receiving at a switch a data signal and a clock signal as inputs, and outputting a voltage signal;
controllably adjusting the phase of said clock signal with respect to said data signal before input to said electronic switch;
receiving at an optical modulator a continuous wave light (CW) signal and said voltage signal as inputs, and generating one of an RZ and a CSRZ signal as output;
wherein said optical modulator is biased at a transmission minimum level to generate a CSRZ signal and wherein said optical modulator is biased at a transmission maximum level and said clock signal is phase shifted to generate an RZ signal.

20. A method according to claim 19 wherein the phase shift of said clock signal is one-quarter cycle.

21. A method according to claim 19 wherein said clock signal has a frequency substantially equal to one-half the data rate of said data signal.

22. A method according to claim 19 wherein said electronic switch outputs said clock signal when said data signal is at a logic high and outputs a zero voltage signal when said data signal is at a logic low.

23. A method of generating both return-to-zero (RZ) and carrier suppressed return-to-zero (CSRZ) signals in optical communications system, said method comprising:
receiving at a switch a data signal and a clock signal as inputs, and outputting a voltage signal;
controllably adjusting the phase of said data signal with respect to said clock signal before input to said electronic switch;
receiving at an optical modulator a continuous wave light (CW) signal and said voltage signal as inputs, and generating one of an RZ and a CSRZ signal as output;
wherein said optical modulator is biased at a transmission minimum level to generate a CSRZ signal and wherein said optical modulator is biased at a transmission maximum level and said data signal is phase shifted to generate an RZ signal.

24. A method according to claim 23 wherein the phase shift of said data signal is one-half bit.

25. A method according to claim 23 wherein said clock signal has a frequency substantially equal to one-half the data rate of said data signal.

26. A method according to claim 23 wherein said electronic switch outputs said clock signal when said data signal is at a logic high and outputs a zero voltage signal when said data signal is at a logic low.

27. A method of generating both return-to-zero (RZ) and carrier suppressed return-to-zero (CSRZ) signals in optical communications system, said method comprising:
receiving at a switch a data signal and a clock signal as inputs, and outputting a voltage signal;
controllably adjusting the phase of at least one of said data signal and said clock signal with respect to each other before input to said electronic switch;
receiving at an optical modulator a continuous wave light (CW) signal and said voltage signal as inputs, and generating one of an RZ and a CSRZ signal as output;
wherein said optical modulator is biased at a transmission minimum level to generate a CSRZ signal and wherein said optical modulator is biased at a transmission maximum level and said clock signal and said data signal are made to be out of phase to generate an RZ signal.

28. A method according to claim 27 wherein said clock signal and said data signal are made to be out of phase by one-half bit.

29. A method according to claim 27 wherein said clock signal has a frequency substantially equal to one-half the data rate of said data signal.

30. A method according to claim 27 wherein said electronic switch outputs said clock signal when said data signal is at a logic high and outputs a zero voltage signal when said data signal is at a logic low.

31. An optical communication transceiver comprising:
a plurality of optical modulator circuits generating both return-to-zero (RZ) and carrier suppressed return-to-zero (CSRZ) signals, each modulator circuit including:
a switch for receiving a data signal and a clock signal as inputs, and outputting a voltage signal;
a unit for controllably adjusting the phase of at least one of said data signal and said clock signal with respect to each other before input to said switch;
an optical modulator for receiving a continuous wave light (CW) signal and said voltage signal as inputs, and outputting one of an RZ and a CSRZ signal;
wherein said optical modulator is biased at a transmission minimum level to generate a CSRZ signal and wherein said optical modulator is biased at a transmission maximum level and said clock signal and said data signal are made to be out of phase to generate an RZ signal; and
a wavelength division multiplexer for combining the generated signals from said plurality of optical modulator circuits for transmission.

32. An optical communication transceiver according to claim 31 wherein said unit controllably adjusts said clock signal before input to said switch and phase shifts said clock signal by one-quarter cycle.

33. An optical communication transceiver according to claim 31 wherein said unit controllably adjusts said data signal before input to said switch and phase shifts said data signal by one-half bit.

34. An optical communication transceiver according to claim 31 wherein said clock signal and said data signal are made, by said unit, to be out of phase by one-half bit.

35. An optical communication transceiver according to claim 31 wherein said unit is an electronic delay line.

36. An optical communication transceiver according to claim 31 further comprising a clock signal generator for generating said clock signal wherein said clock signal has a frequency substantially equal to one-half the data rate of said data signal.

37. An optical communication transceiver according to claim 31 wherein said switch is configured to output said clock signal when said data signal is at a logic high and to output a zero voltage signal when said data signal is at a logic low.

38. An optical communication transceiver according to claim 31 wherein said switch is an analog electronic switch.

* * * * *